(12) United States Patent  
Dayan

(10) Patent No.: US 7,400,859 B2
(45) Date of Patent: Jul. 15, 2008

(54) COMBINED MODULATOR AND MP3 PLAYER HAVING SOCKET POWER SUPPLY ADAPTER AND/OR UNIVERSAL CONNECTOR

(75) Inventor: Mervin A. Dayan, Oakhurst, NJ (US)

(73) Assignee: Intellectual Solutions, Inc., Eatontown, NJ (US)

( * ) Notice: Subject to any disclaimer, the term of this patent is extended or adjusted under 35 U.S.C. 154(b) by 207 days.

(21) Appl. No.: 11/229,981

(22) Filed: Sep. 19, 2005

(65) Prior Publication Data

US 2006/0214511 A1    Sep. 28, 2006

Related U.S. Application Data

(63) Continuation-in-part of application No. 29/233,604, filed on Jul. 7, 2005, now Pat. No. Des. 523,413, and a continuation-in-part of application No. 29/233,682, filed on Jul. 7, 2005, now Pat. No. Des. 521,487, and a continuation-in-part of application No. 29/219,410, filed on Dec. 16, 2004, now Pat. No. Des. 524,285.

(60) Provisional application No. 60/714,048, filed on Sep. 2, 2005, provisional application No. 60/710,732, filed on Aug. 24, 2005.

(51) Int. Cl.
*H04B 7/00* (2006.01)
(52) U.S. Cl. .............. 455/41.2; 455/66.1; 455/3.06; 455/90.3; 455/575.1; 381/2; 386/106; 386/155; 386/125; 386/96
(58) Field of Classification Search .......... 455/66.1, 455/3.06, 41.2; 341/143, 155; 386/106, 386/125, 96
See application file for complete search history.

(56) References Cited

U.S. PATENT DOCUMENTS

D222,967 S    2/1972   Hawkins et al.

(Continued)

*Primary Examiner*—Marceau Milord
(74) *Attorney, Agent, or Firm*—Buchanan Ingersoll & Rooney PC; Brian L. Belles

(57) ABSTRACT

A combined digital audio file player and modulator. In one embodiment, the invention is an apparatus comprising: an elongate housing having a distal end and a proximal end; a socket power adapter located at a distal end of the elongate housing; an interface port in the housing for receiving an external memory device; a user control panel located on the housing at or near the proximal end; a circuit located within the elongate housing and operably coupled to the socket power adapter, the interface port, and the user control panel; and the circuit comprising a processor for retrieving an audio data file stored in a digital format on an external memory device that is in operable cooperation with the interface port, a decoder for decoding the retrieved audio data files, and a transmitter for transmitting the decoded audio data files to a radio tuner. In another embodiment, the invention can be a modulator that transmits data to a radio receiver or digital tuner, comprising multiple input ports or jacks and a signal converter device to transmit the data to the radio receiver or the digital tuner. Still another embodiment of the modulator reproduces compressed audio data; the modulator comprises a housing, an apparatus in the housing to accommodate an external storage device, a mechanism for instructing the modulator to execute an operation, a processing device for reading a data file on the external storage device and a converter to transmit the data to a receiver or digital tuner.

16 Claims, 11 Drawing Sheets

U.S. PATENT DOCUMENTS

| | | |
|---|---|---|
| D243,537 S | 3/1977 | Wahl |
| D303,954 S | 10/1989 | Michels et al. |
| D314,178 S | 1/1991 | Reber |
| D330,887 S | 11/1992 | Wharton |
| D341,123 S | 11/1993 | Hakanen et al. |
| D345,960 S | 4/1994 | Boyd et al. |
| D348,250 S | 6/1994 | Shababy |
| 5,682,431 A | 10/1997 | Ohnishi et al. |
| D392,617 S | 3/1998 | Yokozawa |
| D398,287 S | 9/1998 | Luminosu |
| D401,222 S | 11/1998 | LeBlanc |
| 5,862,235 A | 1/1999 | Kowalczyk |
| D409,568 S | 5/1999 | Lindahl |
| D442,932 S | 5/2001 | Kolke |
| D461,176 S | 8/2002 | Siokola |
| 6,493,546 B2 * | 12/2002 | Patsiokas ................ 455/277.1 |
| 6,535,719 B1 * | 3/2003 | Suzuki et al. ............... 455/112 |
| 6,591,085 B1 | 7/2003 | Grady |
| D492,249 S | 6/2004 | Suomalainen et al. |
| D494,542 S | 8/2004 | Hriscu et al. |
| 6,810,233 B2 * | 10/2004 | Patsiokas ................... 455/3.02 |
| 6,845,398 B1 * | 1/2005 | Galensky et al. ............ 709/231 |
| 6,873,862 B2 * | 3/2005 | Reshefsky ............... 455/569.1 |
| D504,407 S | 4/2005 | Cohen et al. |
| D505,935 S | 6/2005 | Bey et al. |
| D506,455 S | 6/2005 | Bey et al. |
| 6,937,732 B2 * | 8/2005 | Ohmura et al. ............... 381/86 |
| 7,054,596 B2 * | 5/2006 | Arntz ........................ 455/66.1 |
| 7,065,342 B1 * | 6/2006 | Rolf ....................... 455/412.1 |
| 7,103,431 B1 * | 9/2006 | Kamimura et al. ........... 700/94 |
| 2002/0011904 A1 | 1/2002 | Mellot |
| 2002/0173866 A1 | 11/2002 | Dangberg et al. |
| 2002/0197064 A1 | 12/2002 | Bijsmans et al. |
| 2003/0194968 A1 | 10/2003 | Young |
| 2004/0039575 A1 | 2/2004 | Bum |
| 2004/0058649 A1 | 3/2004 | Grady |

* cited by examiner

COMBINED MODULATOR AND MP3 PLAYER HAVING SOCKET POWER SUPPLY ADAPTER AND/OR UNIVERSAL CONNECTOR

CROSS-REFERENCE TO RELATED APPLICATIONS

The present application claims the benefit of U.S. Provisional Application 60/710,732, filed Aug. 24, 2005 and U.S. Provisional Application 60/714,048, filed Sep. 2, 2005, both of which are incorporated herein in their entireties. The present application is also a continuation-in-part of U.S. Design Application 29/219,410, filed Dec. 16, 2004, U.S. Design Application 29/233,604, filed Jul. 7, 2005, and U.S. Design Application 29/233,682, filed Jul. 7, 2005, all three of which are incorporated by reference in their entireties.

FIELD OF THE INVENTION

This invention relates generally to the field of modulators, and specifically to combined modulators and MP3 players for use in automobiles.

BACKGROUND OF THE INVENTION

Many audio and video products are portable. DVD-players, CD-players, cassette players, laptops, stereos, televisions and MP3 players are just a few examples of these products. Some portable audio and video products contain speakers or headphone jacks. However, when traveling in a car or at home, the user may prefer to have better sound quality or have the sound outputted from an element different from the portable unit itself, such as a home or automobile stereo.

Modulators are used to wirelessly connect a portable audio and/or video player to a home or automobile stereo. The portable audio and/or video player is first coupled to the modulator with an audio/video jack or other connection. The modulator is powered by plugging it into a standard wall socket or other source of electrical energy. During operation, the portable audio and/or video player decodes the data files stored on its internal memory and transmits the decoded data to the modulator via the connection in a signal format. The modulator then converts the signal received from the portable audio and/or video player into a radio frequency and transmits the signal for receipt by the tuner of the desired stereo system. While functional, this existing system and mode of operation suffers from a number of deficiencies.

First, existing modulators are not specifically suited for use in automobiles, requiring a separate power adapter that is compatible with a cigarette lighter power source. As such, the user must have three separate components to achieve their goal, the modulator, the audio/video player, and the specialized socket power adapter, not to mention all of the necessary connection cables/wires.

Existing modulators can not function without the audio/video player because they do not have the capability to actually read, process, and/or decompress the data format in which audio and/or video content is stored. Thus, for example, a separate MP3 player, DVD player, and/or CD player is required in addition to the modulator. In such systems, the modulator merely acts an intermediary between the MP3 player, DVD player, and/or CD player and the sound producing device, such as the car stereo system. The modulator can not be simply coupled to an external memory device, such as a CD, disk, USB memory device, etc, that contains the desired audio and/or video data files. This is inconvenient for users that typically store their desired content on portable memory devices.

The inability of existing modulators to actually process data files stored on memory devices presents an additional problem when the user desires to output audio/video content within an automobile. Most automobiles have only one source of electrical power, a single cigarette lighter socket. However, because both the modulator and audio/video player require a power source, one of the devices must be powered by a battery. This is undesirable because batteries run out and can be expensive to replace or timely to charge.

Finally, existing FM modulators currently permit only one type of output port or jack (RCA jacks, firewire or miniplugs) to be used to connect the portable device to the modulators. Many also require additional connections such as cassettes or docking stations. This means modulators are not available for devices that do not use these types of electrical connections. Furthermore, different devices having different output ports or jacks from one another require different modulators because the output mechanisms are not the same, i.e., if an MP3 player has a firewire output and a CD-player has a miniplug output, two different modulators are needed.

Thus, there is a need for an apparatus that does not suffer from the aforementioned drawbacks.

SUMMARY OF THE INVENTION

It is therefore an object of the present invention to provide a combined modulator and digital audio file player, which in one embodiment can be a combined MP3 player and modulator.

Another object of the present invention is to provide a combined modulator and digital audio file player that is compatible for use in automobiles.

Still another object of the present invention is to provide a combined modulator and digital audio file player that can be powered by a cigarette lighter socket.

Yet another object of the present invention is to provide a combined modulator and digital audio file player that contains all of its circuitry in a single in housing.

A further object of the present invention is to provide a combined modulator and digital audio file player that is compatible for use in automobiles and provides the ability to adjust the angle at which the user control panel is oriented.

A yet further object of the invention is to provide a combined modulator and digital audio file player that can be used in conjunction with a variety of external processing devices.

A still further object of the present invention is to provide a combined modulator and digital audio file player that provides the capacity to receive and process data from an external memory device containing data files in a digital and/or compressed format.

It is also an object of the present invention to provide a combined modulator and digital audio file player that can also be used in conjunction with a USB memory device.

These objects and other are met by the present invention, which in one aspect, is a combined digital audio file player and modulator apparatus comprising: an elongate housing having a distal end and a proximal end; a socket power adapter located at a distal end of the elongate housing; an interface port in the housing for receiving an external memory device; a user control panel located on the housing at or near the proximal end; a circuit located within the elongate housing and operably coupled to the socket power adapter, the interface port, and the user control panel; and the circuit comprising means for retrieving an audio data file stored in a digital format on an external memory device that is in operable cooperation with the interface port, means for decoding the retrieved audio data files, and means for transmitting the decoded audio data files to a radio tuner.

In one embodiment of the combined apparatus, the decoding means can be adapted to convert digital signals corresponding to the decoded audio data files to corresponding analog signals, and the transmitting means can be adapted to convert the analog signals to corresponding radio-frequency signals. In an alternative embodiment, the transmitting means may transmit the digital signals to a digital tuner.

In one embodiment, the retrieving means can be a microprocessor, the decoding means can be a decoder, and/or the transmitting means can be a radio-frequency transmitter. If desired, the circuit can further comprise a transceiver, a bus, a universal host controller, a reduced instruction set computer, and a read only memory. It is preferred that the interface port be a USB port and the external memory device be a USB memory device having one or more audio data files stored in an MP3 format. In this embodiment, the combined apparatus can further comprise the USB memory device in operable cooperation with the USB port. In other embodiments, the external memory device can rise a flash disk or drive, flash card, secure data flash card, pen drive, CD, magnetic disk, mini-disk, magneto-optical disk, SRAM, E$^2$PROM, DVD, multimedia memory card, secure digital card, memory stick, CompactFlash card, SecureDigital card or SmartMedia card.

It is further preferable that an audio input jack be included in the housing and that the audio input jack be operably coupled to the circuit between the decoding means and the transmitting means. The circuit can be programmed to (i) retrieve one of the audio files from the external memory device upon receiving a user command from the user control panel; (ii) convert the retrieved audio file to a corresponding digital signal; (iii) transmit the digital signal to the decoding means; (iv) decode and convert the digital signal to a corresponding analog signal; (v) transmit the analog signal to the transmitting means; and (vi) transmit the analog signal as a corresponding radio frequency signal.

In one embodiment, the circuit preferably comprises means for selecting a frequency at which the transmitting means will transmit the decoded audio signal, the housing further comprising means for indicating a selected frequency. The selecting means can be a channel select logic unit and the indicating means can be an LED or digital display in some embodiments.

It is further preferred that the proximal end of the housing flare outwardly so as to form a substantially planar front surface wherein at least a portion of the user control panel is located on the substantially planar surface. In some embodiments, the housing can comprises a first portion pivotally connected to a second portion, wherein the first portion contains the distal end and the second portion contains the proximal end. In this embodiment, it may be preferred to locate the audio input jack on a side of the second portion of the housing and the interface port on a bottom of the second portion of the housing.

The socket power adapter can be a cigarette lighter power adapter. It is also preferred that the first portion of the housing be generally cylindrical in shape and approximately 1 to 3 inches in length and that the substantially planar front surface of the flared proximal end have a generally oval shape.

In another aspect, the invention is a modulator for transmitting data to a radio receiver or digital tuner comprising multiple input ports or jacks and a signal converter device to transmit the data to the radio receiver or the digital tuner.

In yet another aspect, the invention is a modulator for reproducing compressed audio data comprising: a housing; an apparatus in the housing to accommodate an external storage device; a mechanism for instructing the modulator to execute an operation; a processing device for reading data in a file on the external storage device; and a converter to transmit the data to a receiver or digital tuner.

In a further aspect, the invention is a modulator for transmitting data to a radio receiver or digital tuner comprising multiple input ports or jacks and a signal converter device to transmit the data to the radio receiver or the digital tuner.

While the invention is summarized and described herein as a combined modulator and audio file player, the invention is not so limited and can be applied to video files, image files, etc. Moreover, the invention is not limited to use in an automobile, but can be adapted for use with home stereos by replacing the socket power adapter with a standard plug.

BRIEF DESCRIPTION OF THE DRAWINGS

In the drawings, which are discussed below, one or more preferred embodiments are illustrated, with the same reference numerals referring to the same pieces of the invention throughout the drawings. It is understood that the invention is not limited to the preferred embodiments depicted in the drawings herein.

DETAILED DESCRIPTION OF THE DRAWINGS

While the specification concludes with claims particularly pointing out and distinctly claiming the subject matter that is regarded as the invention, the invention will now be further described by reference to the following detailed description of preferred embodiments taken in conjunction with the above-described accompanying drawings.

Figure 1:
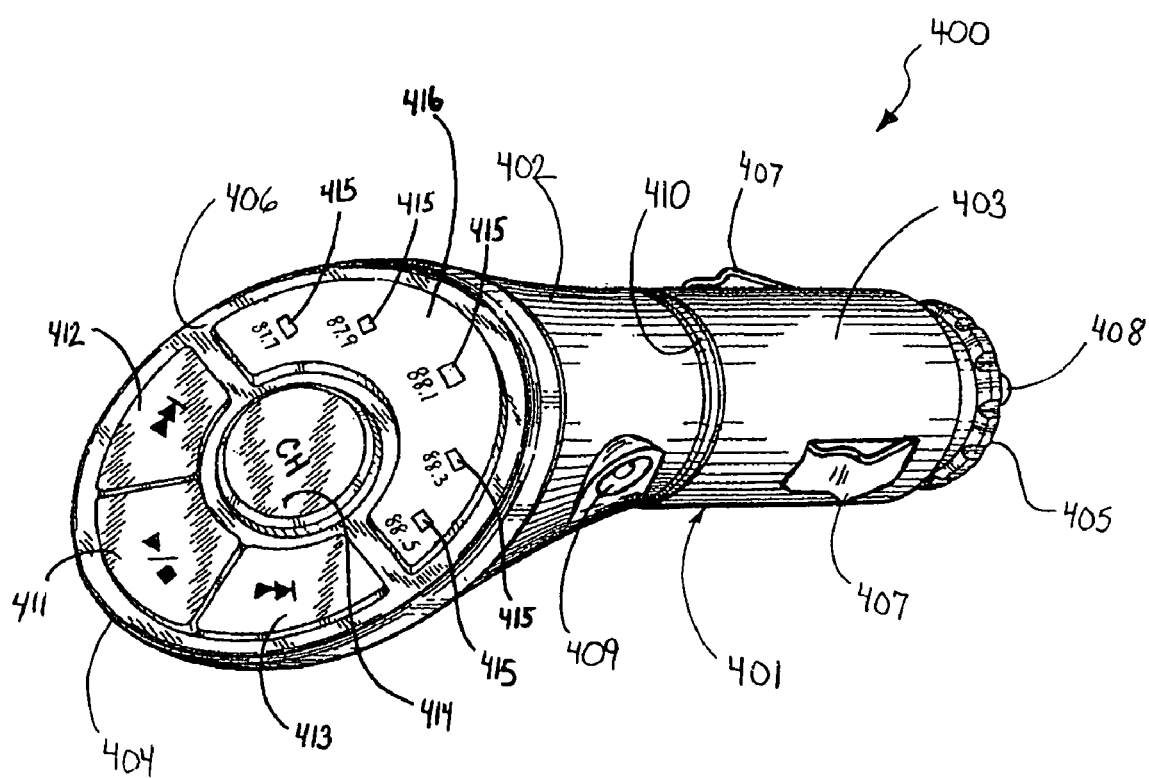
FIG. 1 is a perspective view of a combined modulator and MP3 player according to a first embodiment of the present invention.

Referring to FIG. 1, a combined modulator and MP3 player 400 (hereinafter "MP3/modulator") is illustrated according to a first embodiment of the present invention. The MP3/modulator comprises an elongate housing 401. The elongate housing 401 is preferably made of plastic, but can be constructed of any material desired, including without limitation metal, alloys, polymers, wood, etc. The elongate housing 401 can be a two-piece construction or a single piece construction. The elongate housing 401 can be formed by any suitable process known in the art, including without limitation, an injection molding process, an extruding process, a machining process, etc. In multiple-piece construction embodiments of the hosing 401, the components pieces can be connect any means know in the art, including without limitation, heat welding, adhesive, fasteners, snap-fit, etc.

The elongate housing 401 comprises a proximal end 404 and a distal end 405. The elongate housing 401 also comprises a head portion 402 and a tubular body portion 403. A groove 410 separates the head portion 402 from the tubular body portion 403. The head portion 402 is formed by the elongate housing 400 flaring outwardly from the direction of the distal end 405 to the proximal end 404, such that the head portion 402 takes on a generally truncated bulbous shape. The head portion 402 terminates in an angled fashion in a substantially flat surface 406 at the proximal end 404. The substantially flat surface 406 is preferably oval in shape but can take on any shape desired, including without limitation rectangular, triangular, hexagonal, pentagonal, or irregularly shaped.

The tubular body portion 403 is preferably cylindrical in shape having a circular cross-sectional profile. Preferably, the circular cross-sectional profile of the tubular body portion 403 is sized so that it has a diameter that is slightly smaller than the diameter of a standard cigarette lighter socket commonly incorporated into automobiles. In one embodiment, the diameter of the tubular body portion 403 is within the range of one-half inch to one inch, and more preferably about three-quarters of an inch. The length of the tubular body portion 403 is preferably sized to be at least as long as the depth of standard cigarette lighter sockets that are commonly incorporated into automobiles, most preferably within the range of 1-3 inches.

Figure 9:
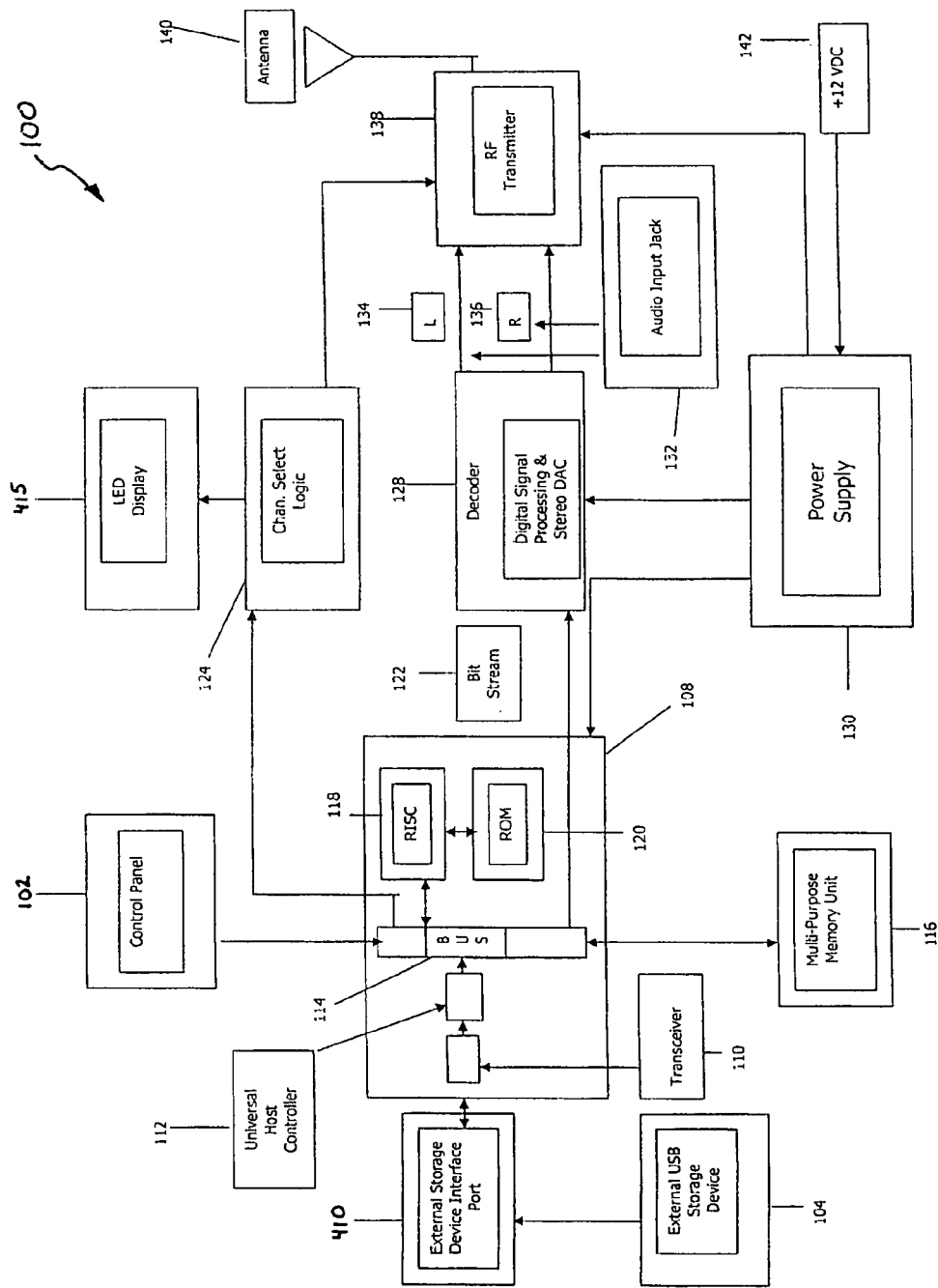
FIG. 9 is a schematic of a circuit used to control the functioning of the combined modulator and MP3 players of FIGS. 1-8 according to an embodiment of the present invention.

Electrical contact leads 407, 408 are located on and protrude from the tubular portion 403. The electrical leads 407, 408 are in operable connection with the internal circuit 100 (FIG. 9). As a result, a socket power adapter is formed that is electrically and sizably compatible with a standard 12 Volt cigarette lighter socket. The circuitry and functioning of the MP3/modulator 400 will be discussed in greater detail be low with respect to FIG. 9.

Referring still to FIG. 1, the MP3/modulator 400 further comprises a female port 409, in the form of an audio input jack port, on the side of the head portion 402 of the elongate housing 401. The female port 409 is accessible from the exterior of the housing 401 so as to be matably engageable with an audio cable whose other end is matably engagable with an audio output port of an electronic device, such as a headphone port of an MP3 player or CD player. Other electronic devices can be used if desired, such as a laptop computer, a cell pone, a personal data assistant, a portable email apparatus, etc. Moreover, the female port 409 is not limited to audio input jack port but can be any type of port desired.

Figure 2:
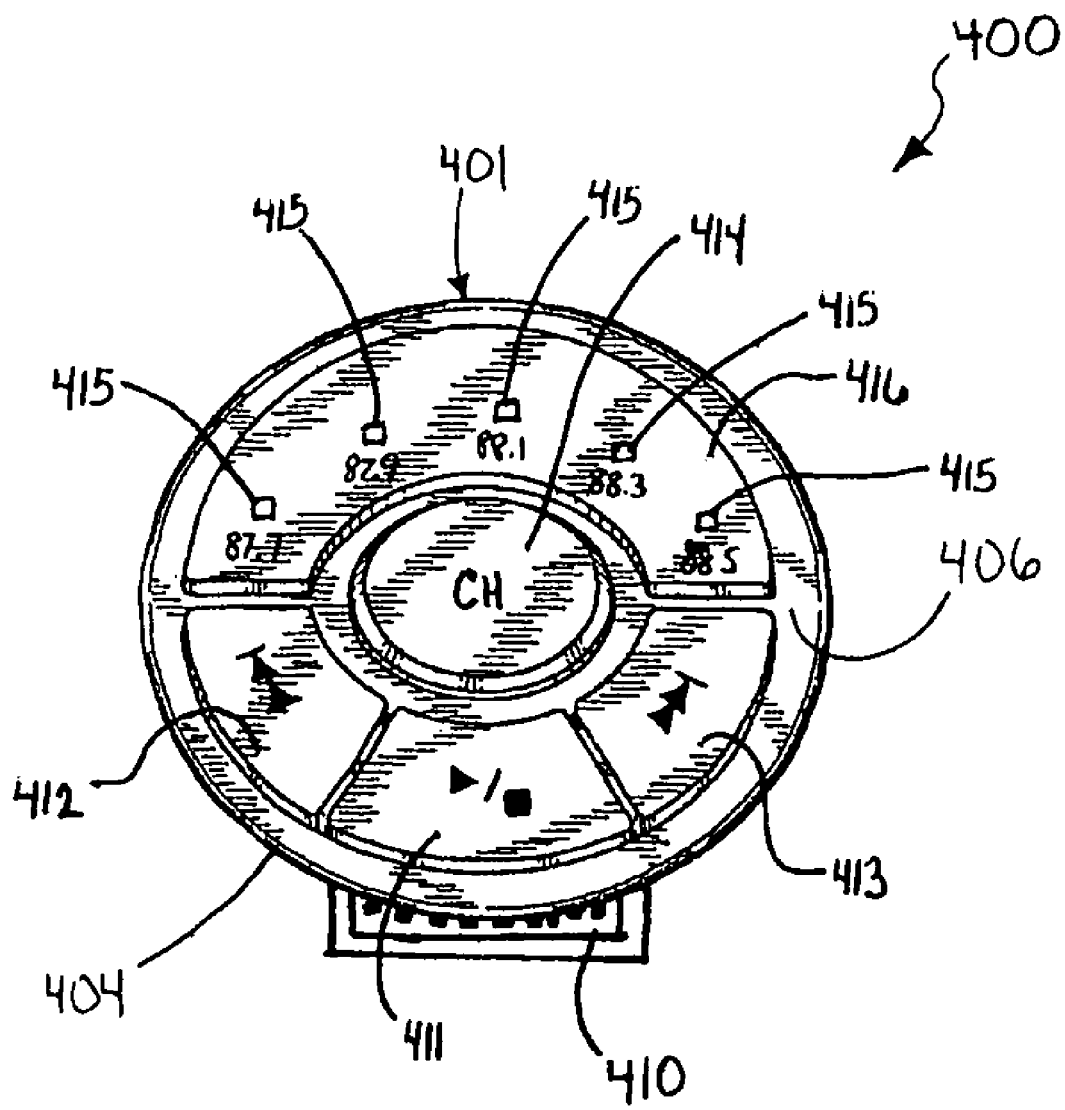
FIG. 2 is a front view of the combined modulator and MP3 player of FIG. 1.
Figure 3:
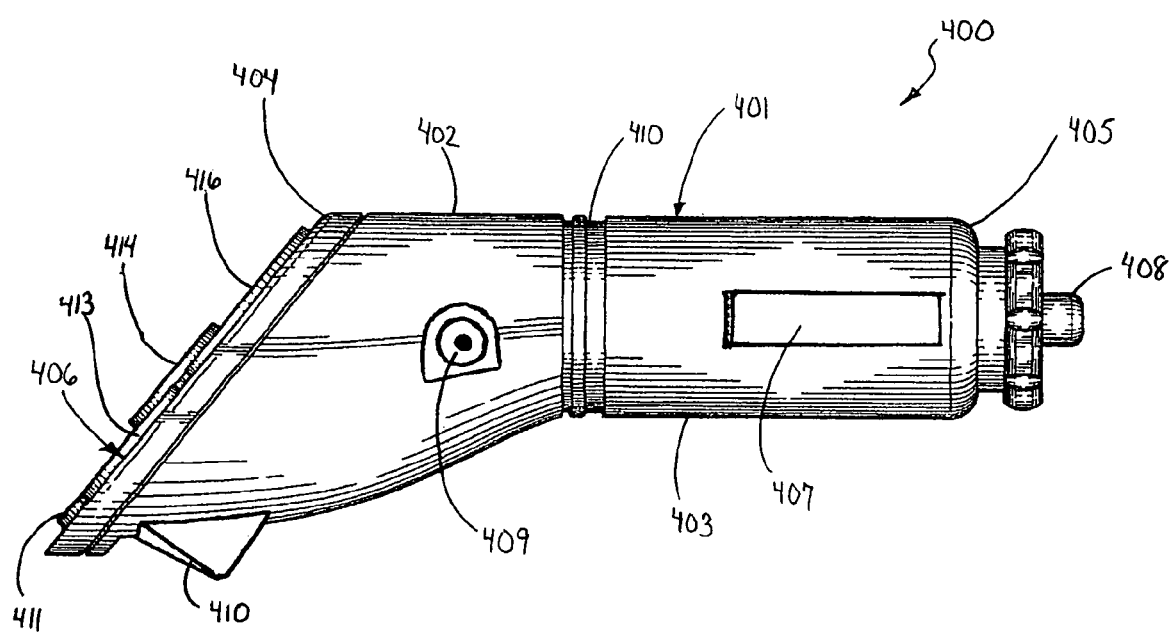
FIG. 3 is a right side view of the combined modulator and MP3 player of FIG. 1.

Referring now to FIGS. 2 and 3, the MP3/modulator further comprises an interface port 410 in the elongate housing 401 for receiving an external memory device. In the illustrated embodiment, the interface port 410 is a USB slot for receiving a USB memory device, such as a USB memory stick, a USB key, etc. The invention, however, is not so limited and the interface port 410 can take on a variety of embodiments, including without limitation a drive or port necessary to operably receive external storage devices such as flash disks or drives, flash cards, secure data flash cards, pen drives, CDs, magnetic disks, mini-disks, magneto-optical disks, SRAM, $E^2$PROM, DVDs, multimedia memory cards, secure digital cards, memory sticks, CompactFlash cards, SecureDigital cards and SmartMedia cards.

The interface port 410 is located on, an accessible from, a bottom of the head portion 402 of the elongate housing 401. The interface port 410 is located at or near the proximal end of the housing 401. In other embodiments, the interface port 410 may be located elsewhere on the housing 401. The interface port 410 is operably coupled to the internal circuit 100 (FIG. 9) so that data files stored on an external memory device that is operably connected to the interface port 410 can be retrieved, decoded, processed, and/or transmitted to a car stereo receiver. This will be discussed in greater detail below with respect to FIGS. 9-11. Although not shown, a port for coupling the firewire port of the MP3 player to the internal circuit 100 may also be present.

Referring back to FIG. 1, the MP3/modulator 400 further comprises a control panel for receiving user input commands located on the substantially flat surface 406 of the head portion 402 of the elongate housing 401. The control panel comprises a "stop/play" button 411, a "back" button 412, a "forward" button 413, a "channel select" button 414, and a display panel 416 comprising a plurality of LEDs 415 for indicating the channel selected. All of the components 411-415 of the control panel are electrically and operably coupled to the internal circuit 100 of the MP3/modulator 400, as will be discussed in detail with respect to FIGS. 9-11. The functions of the "stop/play," "back" and "forward" buttons are self-explanatory and are not further described herein. The "channel select" button 414 permits the user to set the frequency at which the transmitter 138 (FIG. 9) will transmit the radio frequency signals containing the audio content. The frequency/channel that is currently selected will be indicated by illumination of the proper LED 415 on the channel display panel 416.

In alternative embodiments, less or more control buttons may be present and the control panel. For example, the channel display panel 416 can be removed. A manufacturer may preset the frequency to which the modulator is set so that a user cannot change the frequency. Moreover, certain features can be combined on the control panel and/or the ability to select different modes, e.g. audio modes or the desired port to read, can be added.

Figure 10:
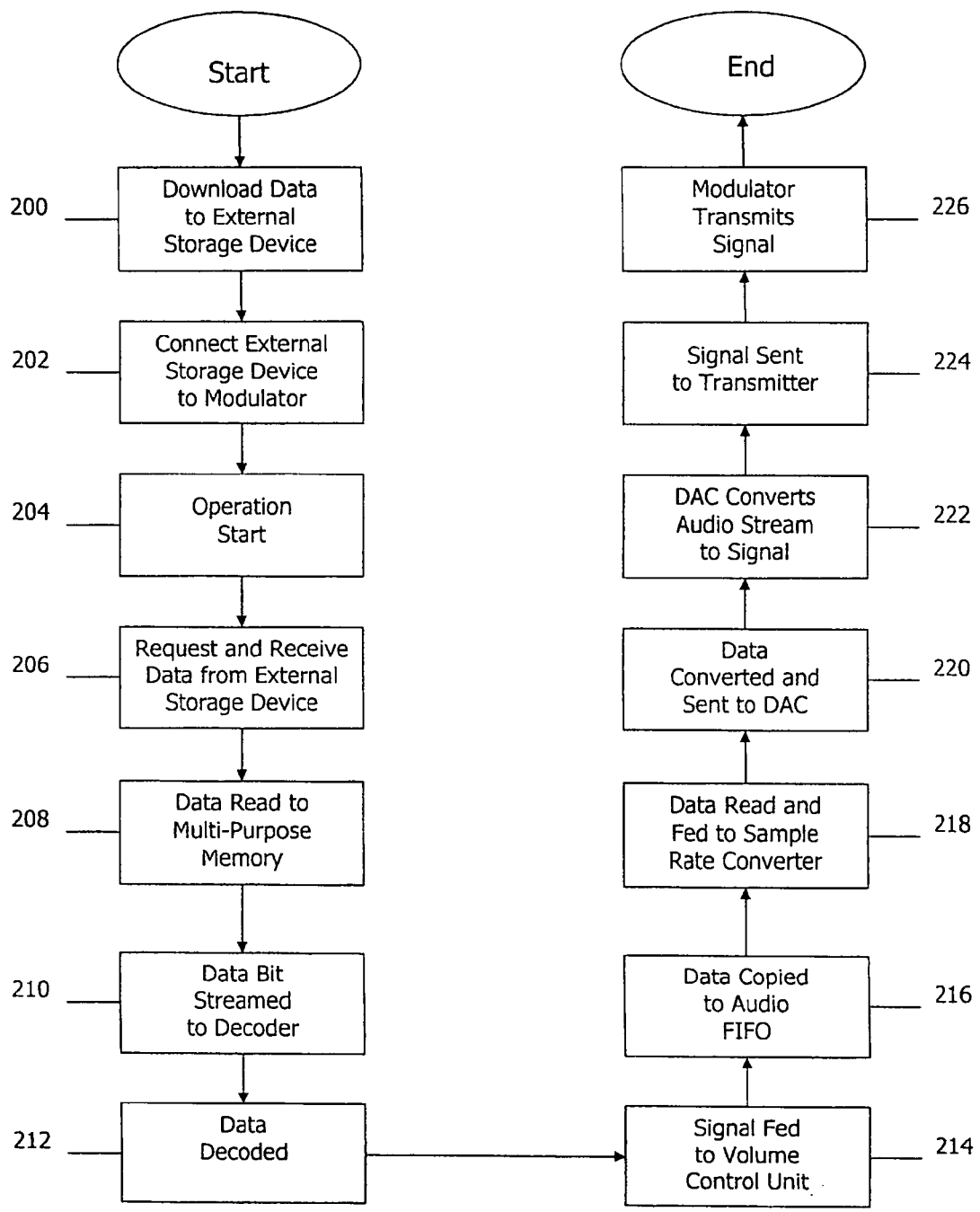
FIG. 10 is a flow chart of the operation of the circuit of FIG. 9.

As will be discussed in greater detail below with respect to FIG. 9-11, the MP3/modulator 400 can be used to transmit audio content, such as that stored in MP3 files, to an automobile stereo for sound output. The exact functioning of the MP3/modulator 400 will be dictated by the user preferences/inputs and the type of external device on which the MP3 files are stored, e.g., whether the MP3 files are stored on a simple memory medium or on the internal memory drive a portable MP3 player. Either way, once the audio content is in suitable condition for transmission as radio frequency signals, the transmitter 138 in the housing 401 of the MP3/modulator 400 generates a radio frequency signal, such as an FM signal. This signal is then transmitted to an FM receiver of the car stereo. The FM receiver of the automobile stereo in turn is coupled by speaker wires to speakers. Alternatively, the FM receiver of the car stereo system can be wirelessly coupled to the speakers. In such manner, the audio content transmitted by the MP3/modulator 400 is transmitted by the FM transmitter to the FM receiver and outputted as sound output by the speakers operably connected to the FM receiver.

The FM transmitter 138 can transmit music played through the MP3/modulator 400 within a range of FM frequencies. The transmitter 138 may be of any suitable type, and operates to transmit music to an FM receiver in the vicinity of the MP3/modulator 400. The FM transmitter 138 may for example be provided having a tuning frequency in the FM band of 87-95 megahertz (MHz) and a transmission range up to 6 feet or more. Stereo transmitters of this type are commercially available and are of appropriate size for incorporation in the MP3/modulator 400. If desired, the FM transmitter 138 may simply transmit at a frequency fixed in the aforementioned 87-95 MHz band or the transmitter 138 may be tunable to select a specific frequency within such spectrum.

In operation, the FM receiver of the stereo system receives the transmitted audio from the MP3/modulator 400. The FM receiver is able to transmit the audio content to the vehicular sound system, e.g., by tuning the FM receiver to the frequency of the transmitter in the MP3/modulator 400.

Figure 4:
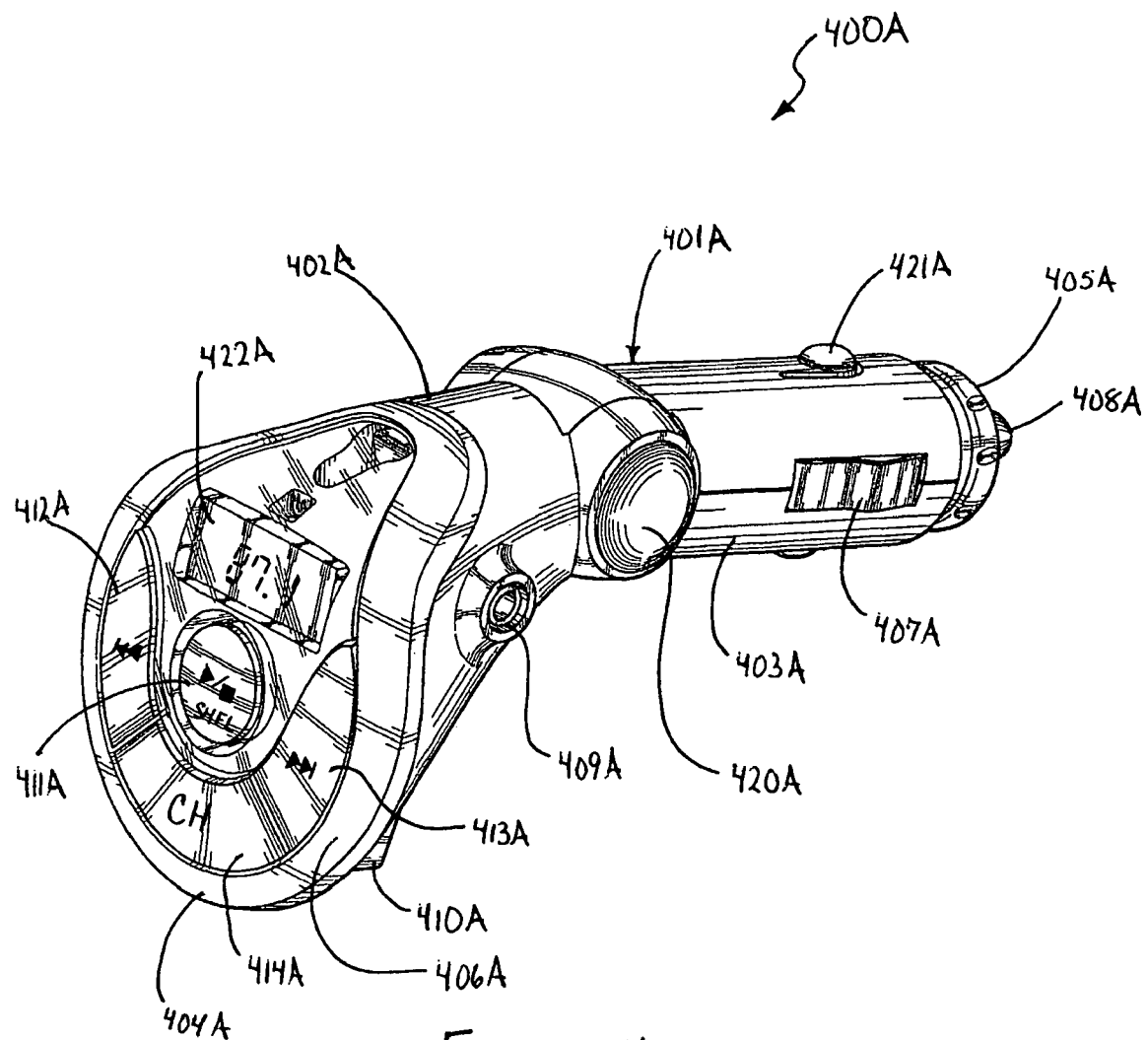
FIG. 4 is a perspective view of a combined modulator and MP3 player having a pivot joint according to a second embodiment of the present invention.

Referring now to FIG. 4, an alternative embodiment of a MP3/modulator 400A is illustrated according to a second embodiment of the present invention. The MP3/modulator 400A is similar to the MP3/modulator 400 of FIGS. 1-3 with certain exceptions. As such, like numbers will be used to identify like elements, with the exception that the alphabetical suffix "A" will be added to the end of the identifier. In order to avoid redundancy, only those important aspects of the MP3/modulator 400A that differ from MP3/modulator 400 will be discussed in detail.

Figure 7A:
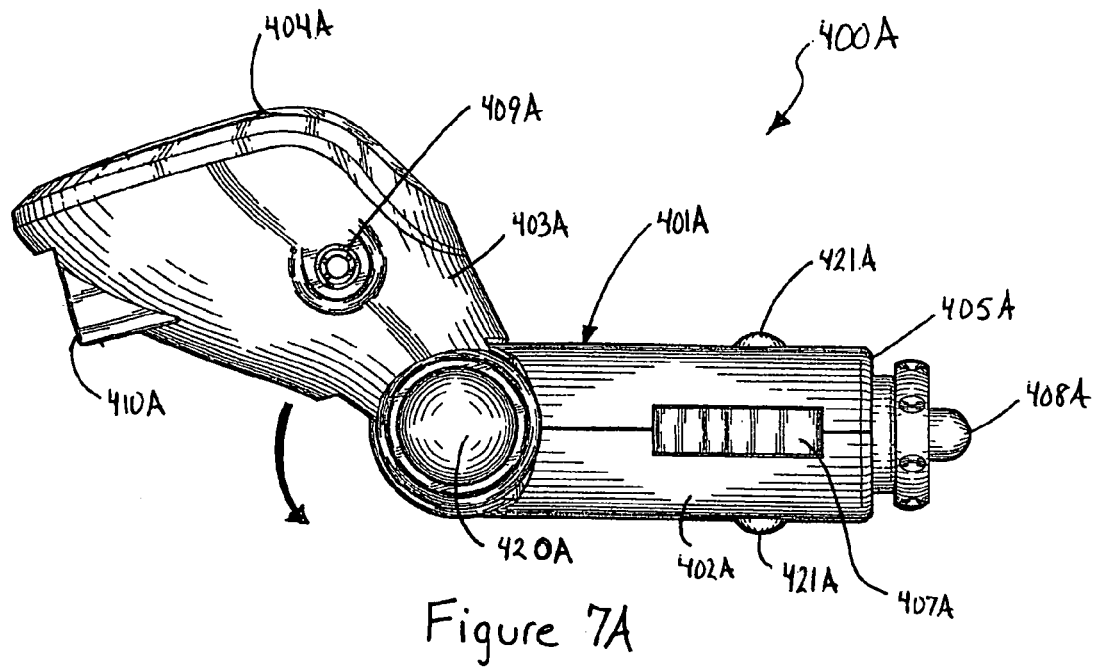
FIG. 7A is a right side view of the combined modulator and MP3 player of FIG. 4 wherein the head portion is fully rotated about the pivot joint in the clockwise direction.
Figure 7B:
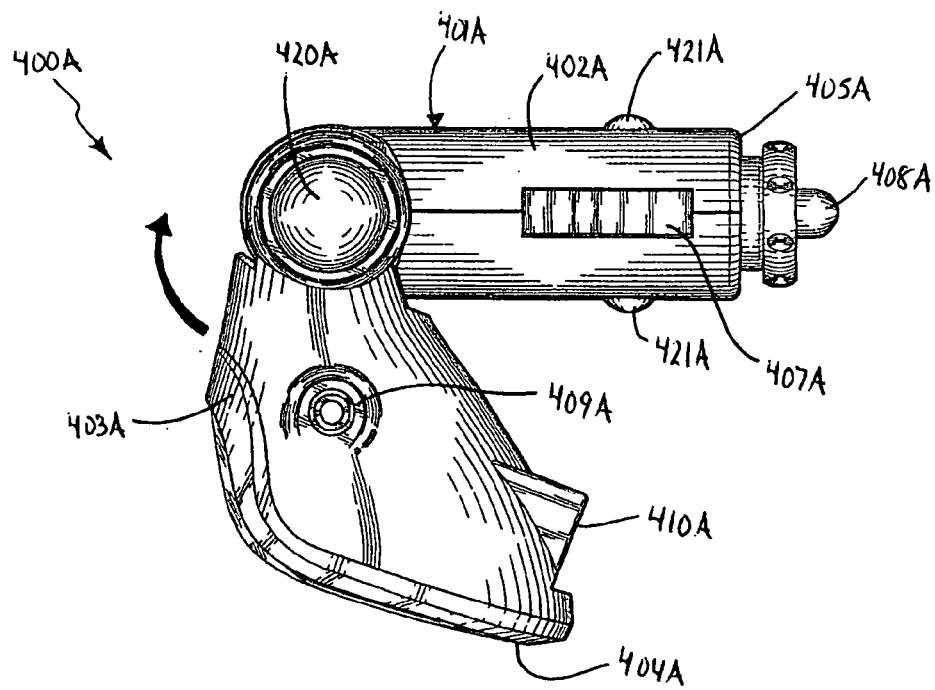
FIG. 7B is a right side view of the combined modulator and MP3 player of FIG. 4 wherein the head portion is fully rotated about the pivot joint in the counter-clockwise direction.

MP3/modulator 400A comprises an elongate housing 401A. The elongate housing 401A comprises a head portion 402A and a body portion 403A. The head portion 402A is pivotally connected to the tubular body portion 403A via pivot joint 420A. The pivot joint 420A provides the ability for the head portion 402A to be pivotable between a first position (shown in FIG. 7A) and a second position (shown in FIG. 7B). As a result, when the tubular body portion 403A is inserted into a cigarette lighter socket during operation, the head portion 402A can be pivoted so that the control panel on the substantially planar surface 406A is conveniently accessible and visible to the user, irrespective of the orientation of the socket.

Referring still to FIG. 4, the control panel of the MP3/modulator 400A comprises a digital display 422A instead of the LEDs. The digital display 422A displays the channel/frequency currently selected by the user.

Figure 5:
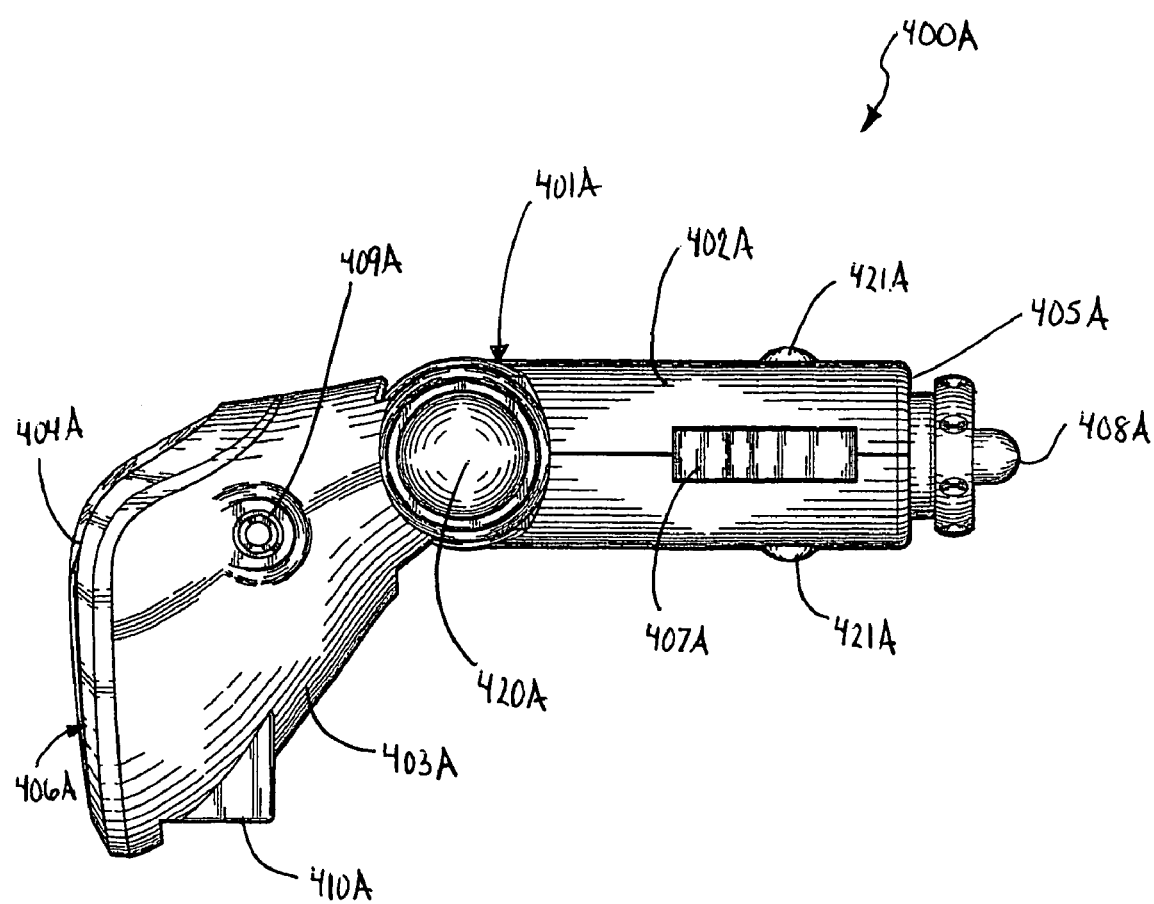
FIG. 5 is a right side view of the combined modulator and MP3 player of FIG. 4.
Figure 6:
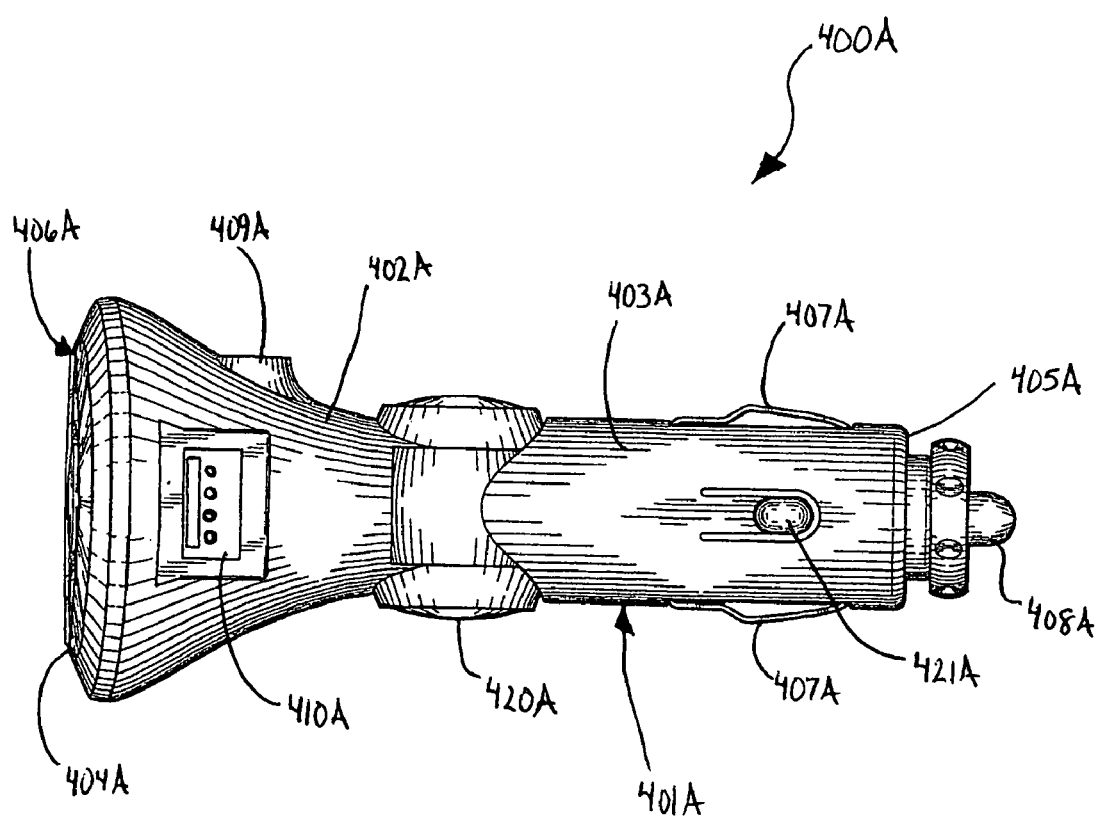
FIG. 6 is a bottom view of the combined modulator and MP3 player of FIG. 4.

Referring now to FIGS. 4 and 5 simultaneously, the MP3/modulator 400A further comprises depressible tabs 421A on the top and bottom of the tubular body portion 403A of the elongate housing 401A. The depressible tabs 421A protrude from the tubular body portion 403A to help keep the MP3/modulator 400A in a tight fit position when positioned in a cigarette lighter socket of an automobile.

Figure 8:
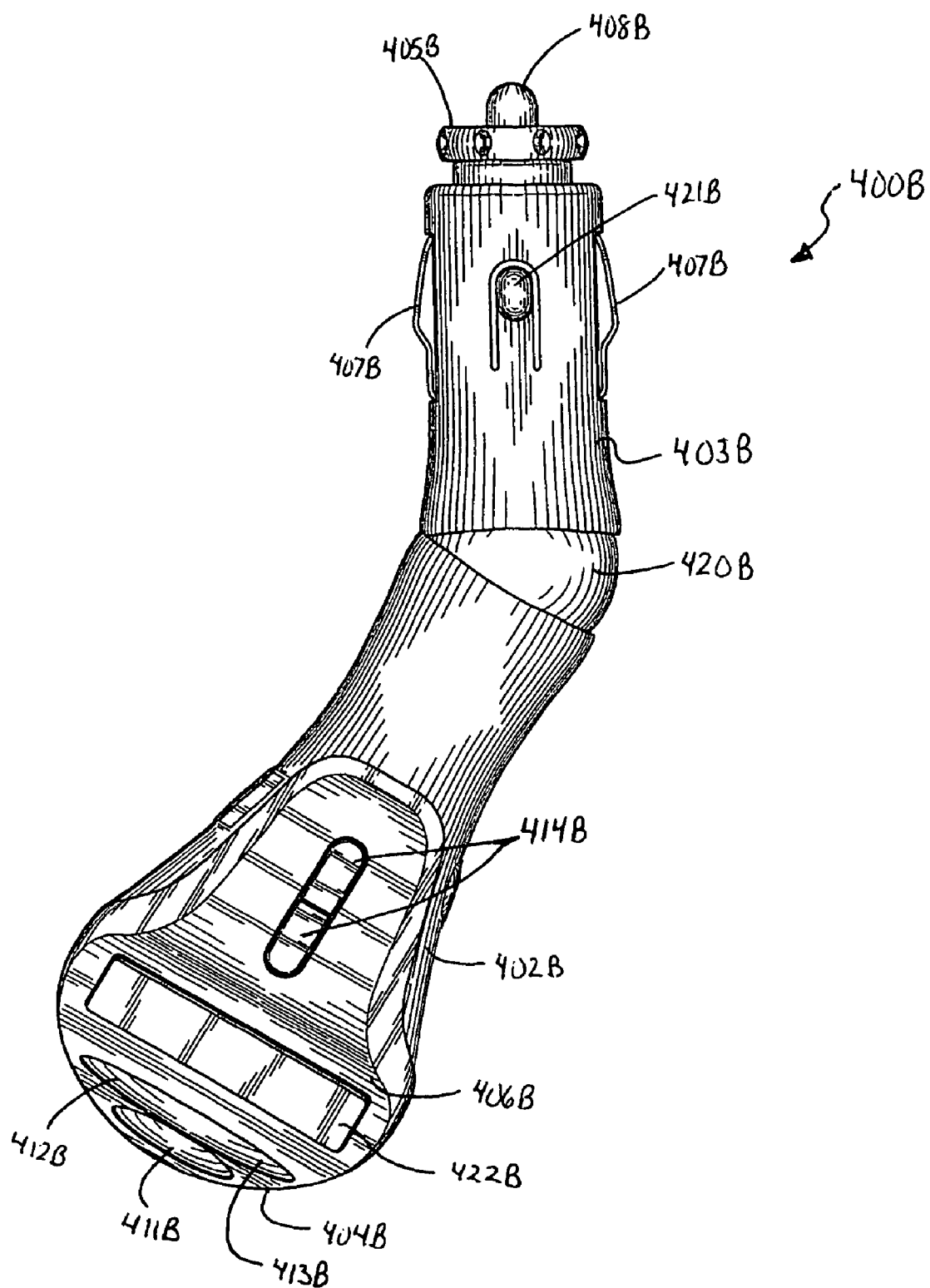
FIG. 8 is a top view of a combined modulator and MP3 player having a ball joint according to a third embodiment of the present invention.

Referring now to FIGS. 8, an alternative embodiment of a MP3/modulator 400B is illustrated according to a second embodiment of the present invention. The MP3/modulator 400B is similar to the MP3/modulator 400 of FIGS. 1-3 and the MP3/modulator 400A of FIGS. 4-7 with certain exceptions. As such, like numbers will be used to identify like elements, with the exception that the alphabetical suffix "B" will be added to the end of the identifier. In order to avoid redundancy, only those important aspects of the MP3/modulator 400B that differ from MP3/modulators 400 and 400A will be discussed in detail.

The MP3/modulator 400B comprises a pivot joint in the form of a ball joint 420B. This allows the head portion 402B to pivot in a three-dimensional directions with respect to the tubular body portion 402B.

As described above, the MP3/modulators 400, 400A, and 400B comprises multiple input ports or jacks for a variety of audio connections, including, but not limited to, firewire, USB, RCA and/or miniplug applications. By having multiple input ports or jacks, users will not be limited to specific modulators for specific portable audio and video devices. In other words, users will be able to use one modulator for a plurality of devices. For example, an individual who owns both an MP3 player that has a USB port and a portable CD-player that has a miniplug will be able to use one modulator that accepts both types of connections. Moreover, users can utilize simple memory devices, such as USB memory sticks, that contain stored MP3 files without the need for a separate MP3 player.

The MP3/modulators 400, 400A, and 400B can be set by the manufacturer or the user to utilize radio frequencies, typically on the FM or AM band. Alternatively or in addition, the MP3/modulators 400, 400A, and 400B can have a digital output so that it can be used with a digital tuner.

In another embodiment of the invention, the MP3/modulators 400, 400A, and 400B can be connected to an external storage device. Non-limiting examples of external storage devices are flash disks or drives, flash cards, secure data flash cards, pen drives, CDs, magnetic disks, mini-disks, magneto-optical disks, SRAM, $E^2$PROM, DVDs, multimedia memory cards, secure digital cards, memory sticks, CompactFlash cards, SecureDigital cards and SmartMedia cards. As discussed above, the MP3/modulators 400, 400A, and 400B modulator has a port corresponding to the external storage device's connector so that the external storage device and the modulator can be operably connected. The modulator has a processing device contained therein so that it can read a file on the external storage device. Optionally, a control module is present so that the user can choose which file to decode and transmit to the radio or digital tuner.

Referring now to FIG. 9, a schematic of the circuit 100 contained within the housing of the MP3/modulator 400 is illustrated. All components of the circuit 100 are operably and electrically connected as needed. Those skilled in the art will appreciate the nature and location of such connections. While the circuit 100 and its functioning will be described in terms of its use in MP3/modulator 400, those skilled in the art will appreciate that the following discussion is also applicable to MP3/modulators 400A and 400B.

The circuit 100 comprises a control panel 102 (which consists of buttons 411-414), an external storage device interface port 410 and a central processing unit 108. The central processing unit 108 is comprised of a transceiver 110, a universal host controller 112, a bus 114, a reduced instruction set computer ("RISC") 118 and read only memory ("ROM") 120.

The control panel 102 functions to generate a signal to instruct the circuit 100 to execute at least one specific operation in response to a user input (for example, operation start/end, file selection, channel selection, etc.). The control panel 102 can have a key input unit that initiates the generation of the signal. The external storage device 104 is connected to the external storage device interface device port 410 and the connection functions to provide a data path for packet data transmitted to the external storage device 104 in response to a data request and data applied from the external storage device 104. The interface port 410 also functions to interface various data transmitted to the external storage device 104 and applied to the external storage device 104 to comply with communication standards.

The bus 114 is electrically connected to the control panel 102, the universal host controller 112, the RISC 118, multi-purpose flash memory 116 and channel select logic unit 124. The CPU 108 integrally controls the respective elements of the system to perform an operation corresponding to a control signal by processing the control signal applied to the control panel 102, requests and receives data from the external storage device 104 and instructs the received data to be applied to a specific path through the transceiver 110.

The multi-purpose memory unit 116 is interconnected with the CPU 108 via the bus 116. The RISC 118 stores an execution program for executing the operations of the circuit 100, which is programmed to execute a corresponding operation according to the instruction of the CPU 108.

The decoder unit 128 is connected to the CPU 108. As shown, the decoder unit 128 is capable of digital signal processing and stereo digital to analog converting. The stereo digital to analog converter ("DAC") separates the audio into left 134 and right 136 channels. The decoder unit 128 optionally is equipped with a buffer to delay transmission speed. The decoder unit 128 functions to convert decoded digital data to analog signals and apply the analog signals to the radio frequency ("RF") transmitter which transmits the signals to an antenna 140. Alternatively, a digital signal converter in addition to or instead of the DAC and/or a sigma-delta converter that can implement a high resolution of more than 16 bits and/or an optical signal converter can be used.

A channel select logic unit 124 is connected to the CPU 108. The channel select logic unit 124 can be either preset by the manufacturer or permit a user of the circuit 100 to determine to which radio frequency the audio signals should be sent. The LED display 415 (or digital display 422A or 422B) is electrically connected to the channel select logic unit 124. The LED display 415 can also indicate whether the MP3/modulator 400 has power or not.

The circuit 100 is powered by a power supply unit 130 (which is formed by the electric leads 407, 408). The power supply unit 130 is connected to the CPU 108, the decoder 128, and the RF transmitter 138. The power supply 130 can be powered by a 12 Volt socket 142.

Although the above-described control panel unit 102, universal host controller 112, and RISC 118 have been described as being separated from each other, they may be implemented as a single chip. Also, the multi-purpose memory unit 116 may be incorporated into the control panel 102 and/or RISC 118, or other unit found within the modulation.

Figure 11:
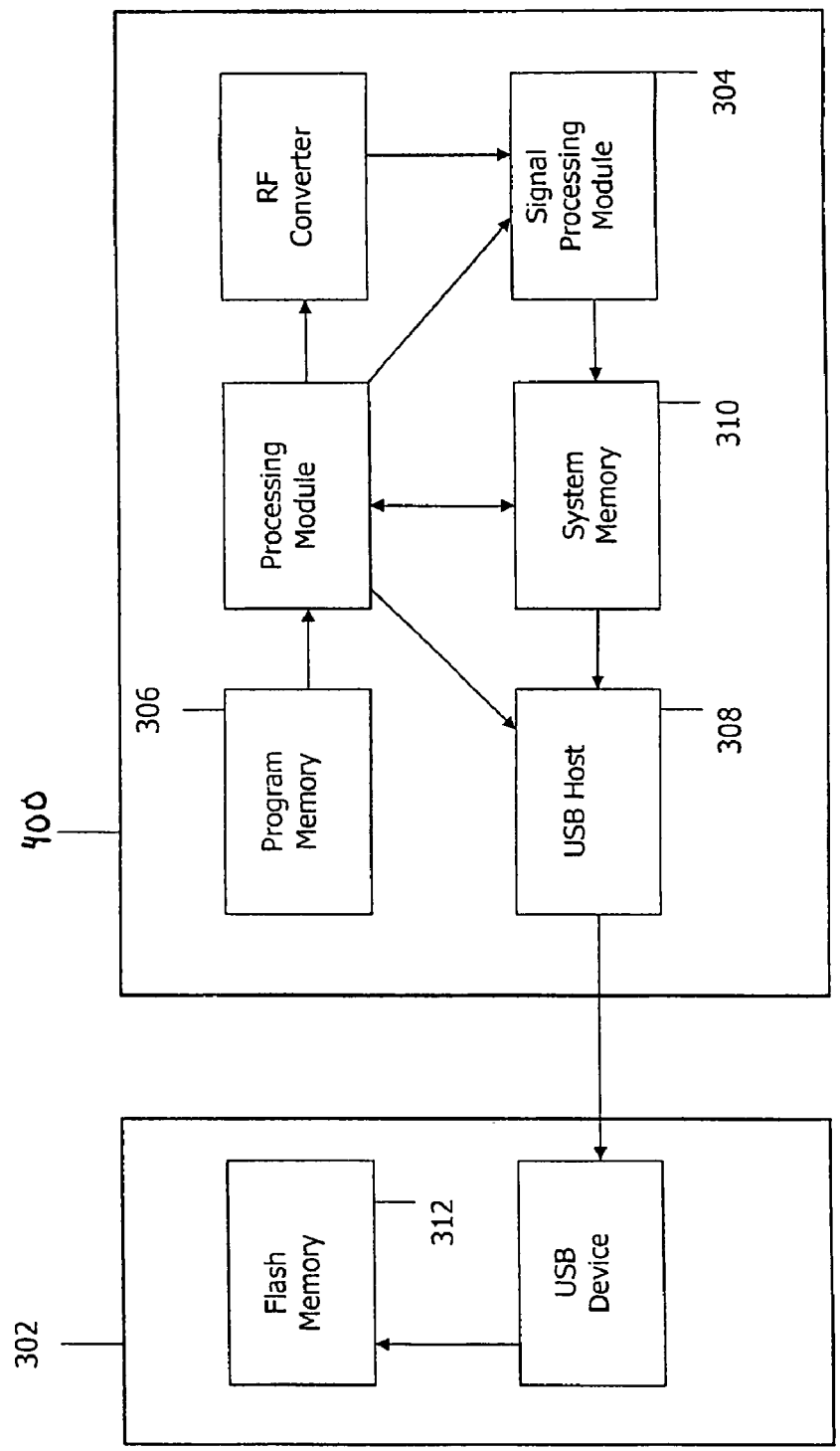
FIG. 11 is a schematic of an alternative circuit that can be used to control the combined modulator and MP3 players of FIGS. 1-8 according to an embodiment of the present invention.

Referring now to FIG. 11, a flowchart of the operation of the circuit 100 of FIG. 9 is illustrated. Only the reproduction operation of the modulator is described herein because the other operations, including, but not limited to, music selection and music change operations, are the same as or similar to those of general MP3 or other portable audio devices.

First, a user connects the external storage device to a PC or other device capable of downloading or saving files to the external storage device at step 200. Next, the user disconnects the external storage device from the device used to download or save files thereon and connects the connector of the external storage device to the modulator at step 202. The CPU 108 determines whether the control panel 102 has been activated, and if it has been activated, the CPU 108 executes the initiation mode required to initiate operations at step 204.

If the control panel 102 has not been activated, the CPU 108 stands by; in an alternative embodiment, the circuit 100 automatically begins the initiation mode after detecting an external storage device is connected thereto. If the control panel 102 is activated, the program written to the ROM 120 directs the RISC 118 to request data from the external storage device through the transceiver 110 and the CPU 108 receives the data at step 206. The universal host controller 112 reads the data, and a built-in phase lock loop ("PLL") provides timing to the RISC 118 and transceiver 110. An external crystal, including, but not limited to, a 14.318 MHz crystal, provides the time base for the PLL. The received data is read to the multi-purpose memory 116 at step 208. The data then is applied to the decoder unit 128 via bit stream 122 at step 210. The data is decoded and, optionally, a signal is fed to a volume control unit 214. The data is copied to audio FIFO at step 216. The audio FIFO (first in and first out) holds the data, which is read by the audio interrupt and fed to a sample rate converter and an 18-bit over sampling, multi-bit, sigma-delta digital to analog converter at steps 218 and 220.

The sample rate converter converts all different samples rates to CLKI/512 and feeds the data to the DAC. At step 222, the DAC 128 converts the single digital audio stream into a two channel, left 134 and right 136, analog signal. The analog signal is sent to the transmitter 138 and the transmitter transmits the signal at steps 224 and 226. The signal is transmitted through the antenna of a radio.

When a digital signal converter, a sigma-delta converter or an optical signal converter is used to convert the signal instead of the DAC 128, the data is sent to the corresponding converter in step 218. The DAC 128 in steps 220 and 222 is replaced by the signal converter implemented.

It should be apparent to one skilled in the art that the above-described MP3/modulator 400, and its circuit 100, can act as a player for MP3, WAV, WMA, RA, VOC, APE, CDA, AIF and/or any other audio files.

Turning now to FIG. 11, another embodiment of the inside construction and operation of the MP3/modualotor 400 is shown that can be used in combination with an external storage device 302 having a USB connector. In the MP3/modulator 400, a signal processing module 304 may perform an encoding operation using a certain signal processing method, including, but not limited to, MPEG-1, MPEG-2, MPEG-3, MPEG4, Audio Layer 3, a TVF format or an OGG format. The signal processing module 304 outputs data by encoding input signals transmitted from a certain information source using the signal processing method, and constructs a file by arranging the encoded data in a certain file format. The signal format used to perform the decoding operation may be identical to or different from the format used to perform the encoding operation. The MP3/modulator is not limited to a specific signal format.

The file constructed by the MP3/modulator 400 is positioned on the system memory 306. If the external storage device 302 cannot be accessed when the file is constructed, waiting is performed and the media file is copied to the external storage device through a USB host 308 when the external storage device 302 can be accessed. If the external storage device 302 can be accessed when the media file is constructed, the media file is copied from the system memory 310 to the external storage device 302.

When outputting data by encoding input signals transmitted from a certain information source using the signal processing method and constructing a media file by arranging the encoded media data in a certain file format, a media file may be constructed by integrating the data that are processed until the amount of data reaches a first critical value and to copy the constructed file to flash memory. In this scenario, the system memory 310 may be constructed to temporarily store a plurality of media files, and a second critical value may be set to the capacity of media files that can be accommodated in the system memory 310. When the size of files reaches the second critical value, the files existing in the system memory 310 may be copied to the external storage device 302. The copying of files to the external storage device 302 may be performed in a background fashion with respect to the operation of encoding the data.

Several different methods exist to power the modulator with electricity. One method is to have a chord connected to the modulator that can plug into an electrical outlet. Another method is to have the chord plug into a 12-volt socket (as shown in FIG. 9) in an automobile. A third method is to have the modulator be battery-powered. Alternatively, the modulator can be hard-wired in an automobile.

The modulator can incorporate a battery charging mechanism so that when a portable device with a rechargeable battery is connected to the modulator, the rechargeable battery can be charged.

The transmitter of the MP3/modulator 400 is now described with respect to FM frequencies. As stated previously, alternative embodiments of the transmitter have the radio frequency be on the AM band or have a digital output so that the MP3/modulator 400 can be used with a digital tuner in addition to or in lieu of the FM transmitter. Any of the different types of transmitters, i.e., FM, AM or digital transmitter, may be present individually or together.

The FM transmitter transmits audio played through the audio device or external storage device connected to the modulator to a range of FM frequencies, enabling FM reception of audio music signals that then can be played through an FM receiver, such as an FM radio receiver in a vehicle, an FM radio in proximity to the modulator and otherwise for extended area broadcast of the audio files. When used in a vehicle, the FM transmitter transmits the audio to the FM receiver in the vehicle, enabling the acoustic system of the vehicle to be employed for broadcast of the audio to the interior passenger compartment of the vehicle.

Although the ensuing discussion is directed to an embodiment having specific use and applicability to the Apple® iPOD MP3 player, it will be recognized that the utility of the modulator is not thus limited, but rather extends to and encompasses any other audio devices, as previously indicated.

The present invention may be embodied in other specific forms without departing from the spirit or essential attributes thereof and, accordingly, reference should be made to the appended claims, rather than to the foregoing specification, as indicating the scope of the invention.

What is claimed is:

1. A combined digital audio file player and modulator apparatus comprising:
   an elongate housing having a substantially cylindrical distal portion and a proximal portion that flares outwardly from the substantially cylindrical distal portion and has a control panel surface;
   a cigarette lighter power adapter formed into the substantially cylindrical distal portion of the elongate housing;
   an interface port in the elongate housing for receiving an external memory device;
   a user control panel located on the control panel surface of the proximal portion;
   an audio input jack in the elongate housing;
   a circuit located within the elongate housing and operably coupled to the cigarette lighter power adapter, the interface port, the audio input jack, and the user control panel;
   the circuit comprising means for retrieving an audio data file stored in a digital format on an external memory device that is in operable cooperation with the interface port, means for decoding the retrieved audio data files, and means for transmitting the decoded audio data files or an audio signal received by the audio input jack to a radio timer.

2. The combined apparatus of claim 1 further:
   wherein the decoding means is adapted to convert digital signals corresponding to the decoded audio data files to corresponding analog signals; and
   wherein the transmitting means is adapted to convert the analog signals to corresponding radio-frequency signals.

3. The system of claim 1 wherein the retrieving means is a microprocessor, the decoding means is a decoder, and the transmitting means is a radio-frequency transmitter.

4. The combined apparatus of claim 1 wherein the circuit further comprises a transceiver, a bus, a universal host controller, a reduced instruction set computer, and a read only memory.

5. The combined apparatus of claim 1 wherein the interface port is USB port and the external memory device is USB memory device having one or more audio data files stored in an MP3 format, the combined apparatus further comprising the USB memory device in operable cooperation with the USB port.

6. The combined apparatus of claim 1 further comprising an external memory device in operable connection with the interface port, the memory device comprising one or more audio data files stored in a digital format.

7. The combined apparatus of claim 6 wherein the external memory device comprises a flash disk or drive, flash card, secure data flash card, pen drive, CD, magnetic disk, minidisk, magneto-optical disk, SRAM, $E^2PROM$, DVD, multimedia memory card, secure digital card, memory stick, CompactFlash card, SecureDigital card or SmartMedia card.

8. The combined apparatus of claim 6 wherein the circuit is programmed to (i) retrieve one of the audio files from the external memory device upon receiving a user command from the user control panel; (ii) convert the retrieved audio file to a corresponding digital signal; (iii) transmit the digital signal to the decoding means; (iv) decode and convert the digital signal to a corresponding analog signal; (v) transmit the analog signal to the transmitting means; and (vi) transmit the analog signal as a corresponding radio frequency signal.

9. The combined apparatus of claim 1 wherein the circuit further comprises means for selecting a frequency at which the transmitting means will transmit the decoded audio signal, the housing further comprising means for indicating a selected frequency.

10. The combined apparatus of claim 9 wherein the selecting means is a channel select logic unit and the indicating means is an LED or digital display.

11. The combined apparatus of claim 1 wherein the distal portion is pivotally connected to the proximal portion.

12. The combined apparatus of claim 11 further comprising:
   the audio input jack located in a side of the proximal portion of the housing, the audio input jack operably coupled to the circuit between the decoding means and the transmitting means; and
   wherein the interface port is located on a bottom of the proximal portion of the housing.

13. The combined apparatus of claim 1 further comprising:
the audio input jack operably coupled to the circuit between the decoding means and the transmitting means; and
wherein the interface port is located on a bottom of the housing.

14. The combined apparatus of claim 1 wherein the distal portion is pivotally connected to the proximal portion.

15. The combined apparatus of claim 14 further:
wherein the circuit further comprises means for selecting a frequency at which the transmitting means will transmit the decoded audio signal; and
wherein the control panel surface comprises means for indicating a selected frequency.

16. A combined digital audio file player and modulator apparatus comprising:
an elongate housing having a distal end and a proximal end;
a socket power adapter located at a distal end of the elongate housing;
an interface port in the housing for receiving an external memory device;
a user control panel located on the housing at or near the proximal end;
a circuit located within the elongate housing and operably coupled to the socket power adapter, the interface port, and the user control panel;
the circuit comprising means for retrieving an audio data file stored in a digital format on an external memory device that is in operable cooperation with the interface port, means for decoding the retrieved audio data files, and means for transmitting the decoded audio data files to a radio timer;
an audio input jack in the housing, the audio input jack operably coupled to the circuit between the decoding means and the transmitting means;
an external memory device in operable connection with the interface port, the memory device comprising one or more audio data files stored in a digital format;
wherein the decoding means is adapted to convert digital signals corresponding to the decoded audio data files to corresponding analog signals;
wherein the transmitting means is adapted to convert the analog signals to corresponding radio-frequency signals;
wherein the retrieving means is a microprocessor, the decoding means is a decoder, and the transmitting means is a radio-frequency transmitter;
wherein the circuit further comprises a transceiver, a bus, a universal host controller, a reduced instruction set computer, and a read only memory;
wherein the interface port is USB port and the external memory device is USB memory device having one or more audio data files stored in an MP3 format;
wherein the circuit is programmed to (i) retrieve one of the audio files in the MP3 format from the external memory device upon receiving a user command from the user control panel; (ii) convert the retrieved MP3 file to a corresponding digital signal; (iii) transmit the digital signal to the decoding means; (iv) decode and convert the digital signal to a corresponding analog signal; (v) transmit the analog signal to the transmitting means; and (vi) transmit the analog signal as a corresponding radio frequency signal;
wherein the circuit further comprises means for selecting a frequency at which the transmitting means will transmit the decoded audio signal, the housing further comprising means for indicating a selected frequency;
wherein the selecting means is a channel select logic unit and the indicating means is an LED or digital display;
wherein the housing comprises a first portion and a second portion, the first portion containing the distal end and the second portion containing the proximal end;
wherein the first portion of the housing is generally cylindrical in shape and approximately 1 to 3 inches in length;
wherein the proximal end of the housing flares outwardly so as to form a substantially planar front surface, at least a portion of the user control panel being located on the substantially planar surface, the substantially planar front surface having a generally oval shape;
wherein the USB port is located on a bottom of the second portion of the housing;
wherein the socket power adapter is a cigarette lighter power adapter;
wherein the audio input jack is located in a side of the second portion of the housing; and
wherein means for indicating a selected frequency is located on the substantially planar surface.

* * * * *